Jan. 19, 1971  G. F. BARTEL  3,556,595
SEAT CONSTRUCTION AND THE LIKE
Filed Jan. 17, 1969  3 Sheets-Sheet 1
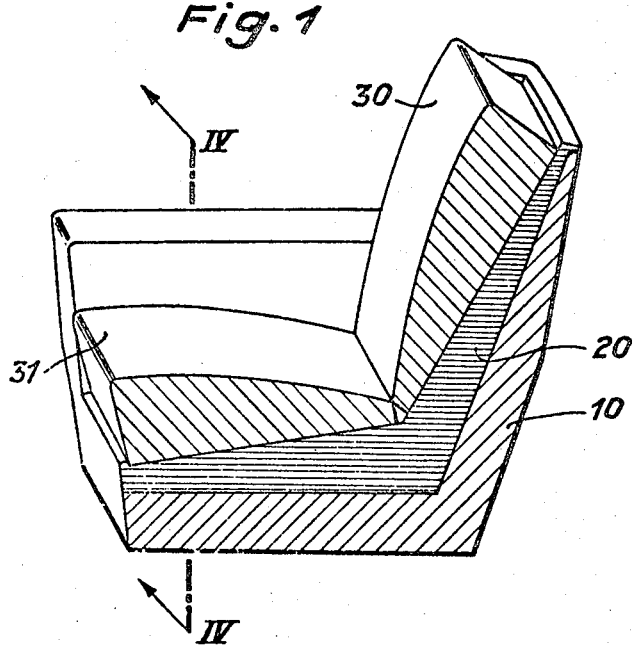
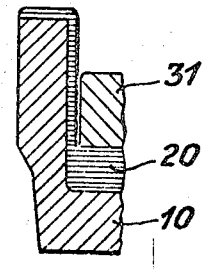
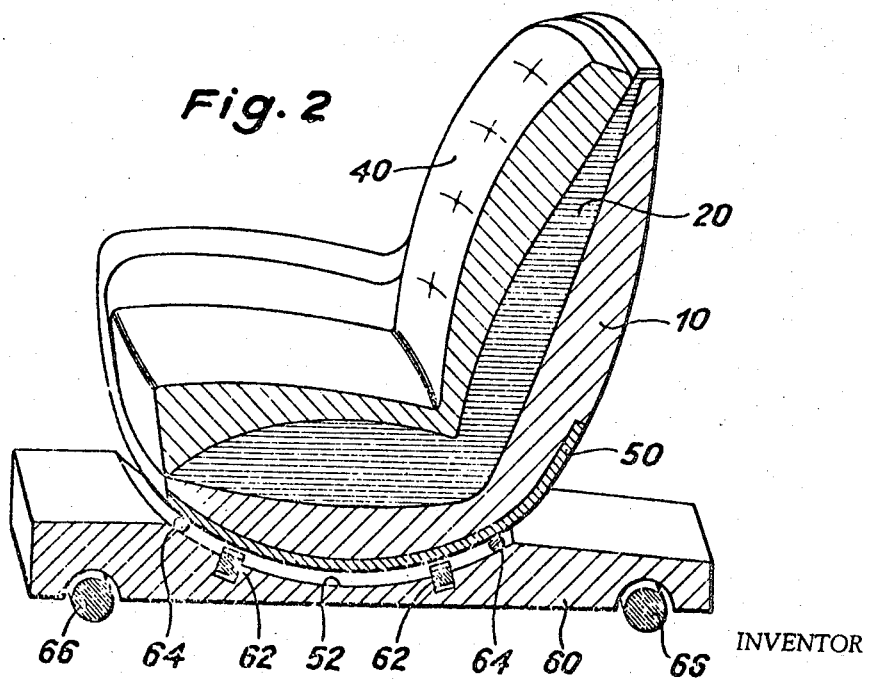
INVENTOR
GÜNTER FRIEDRICH BARTEL
BY
ATTORNEY

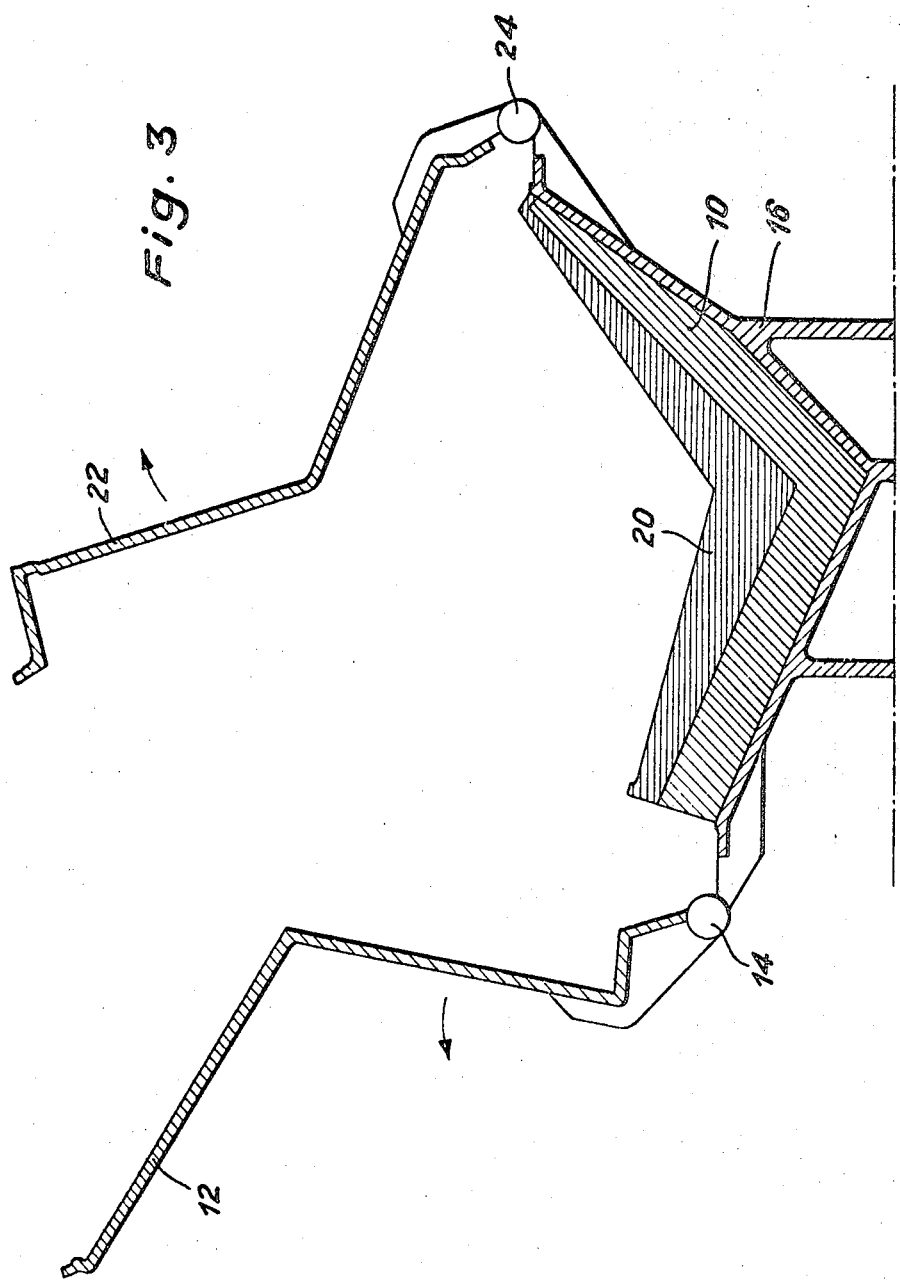

Jan. 19, 1971  G. F. BARTEL  3,556,595
SEAT CONSTRUCTION AND THE LIKE
Filed Jan. 17, 1969  3 Sheets-Sheet 3

INVENTOR
GÜNTER FRIEDRICH BARTEL

BY *Clelle W. [signature]*

ATTORNEY 3,556,595
SEAT CONSTRUCTION AND THE LIKE
Günter Friedrich Bartel, Lotte Kries,
Tecklenburg, Germany
Continuation-in-part of application Ser. No. 714,964,
Mar. 21, 1968. This application Jan. 17, 1969, Ser.
No. 792,014
Claims priority, application Germany, Jan. 30, 1968,
1,685,173
Int. Cl. A49c 4/02, 27/08
U.S. Cl. 297—457                                    9 Claims

ABSTRACT OF THE DISCLOSURE

A seat such as a chair, sofa or the like having a rigid polyurethane foam frame and a semi-rigid polyurethane foam upholstery layer cohesively bound together is molded in separate molding steps without removal from the mold between molding steps.

---

This application is a continuation-in-part of my application Ser. No. 714,964, filed Mar. 21, 1968.

This invention relates generally to an article of furniture and more particularly to a seat of novel construction and a method and apparatus for making it.

A chair or similar seat is usually constructed by assembling separately constructed frame, springs and cushions. The frame is often made from wood and has coil springs or spring elements supported between the chair bottom and cushion upon which the occupant sits. Legs, rollers or the like are built into the frame or attached to it before or after upholstering chairs. An upholstered vehicle seat is installed on a track or in a fixed position in the vehicle.

It has been proposed to use plastics in seat construction and polyurethane foams have been accepted commercially particularly for making seat cushions. It has also been proposed to mold the supporting portion and the cushioning portion of a chair separately and to later adhesively bind them together. One such method is disclosed in U.S. Pat. 3,314,721. Methods of this type have the disadvantage of requiring handling of the elements of the chair and the resulting product may separate into its component parts if the adhesive deteriorates upon aging.

It is an object of this invention to provide an improved method of molding a plastic seat. Another object of the invention is to provide a method for making a unitary upholstered seat frame having molded elements cohesively bound together. Still another object of the invention is to provide an improved seat construction having component parts of differing degrees of rigidity molded into cohesively bound relationship.

Other objects will become apparent from the following description with reference to the accompanying drawing in which:

FIG. 1 is a perspective view, partially in section, of one embodiment of this invention;

FIG. 2 is a perspective view, partially in section, of another embodiment of the invention which is adapted for installation in a vehicle;

FIG. 3 illustrates diagrammatically an embodiment of an injection mold suitable for molding a seat in accordance with this invention;

FIG. 4 illustrates in a fragmentary section a portion of the embodiment of FIG. 1 taken along the line IV—IV;

Figure 5:
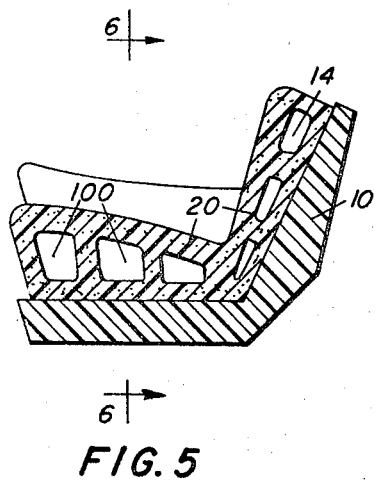
FIG. 5 is a longitudinal section of still another embodiment of the invention.

The foregoing objects and others are accomplished in accordance with this invention, generally speaking, by providing a seat having a frame or support of molded rigid polyurethane foam and an upholstery layer of a semi-rigid polyurethane foam cohesively bound together. Such a seat is made in accordance with this invention by molding the frame from a foamable polyurethane reaction mixture which expands into a rigid polyurethane and then molding an upholstering element over the frame, before removing it from the mold, from a foamable reaction mixture which expands and solidifies into a semi-rigid polyurethane foam. The resulting molded construction may then be covered with a cushion of flexible polyurethane foam.

The process provided by this invention is not only simpler than those heretofore available but is also less expensive. Mold costs are greatly reduced because the same mold bottom can be used interchangeably with several lids or tops of different configurations to produce seats having a variety of shapes all having the same basic frame structure. Also, as described in more detail hereinafter, danger of damaging the frame during construction of the seat is avoided by leaving the frame in the protective mold until after the frame has been upholstered.

In one embodiment of this invention, the frame of rigid polyurethane foam, the upholstery of semi-rigid polyurethane foam and a cushion layer of flexible polyurethane foam are molded successively without removal from the mold, using the same mold bottom but changing the mold top and the composition of the foamable reaction mixture. This process can be practiced to advantage using an apparatus of the type described in copending application Ser. No. 710,903 filed Mar. 6, 1968 based on German application No. E 33545, filed Mar. 8, 1967. With such an apparatus the same reactive components can be used in making all of the polyurethane foams with the rigidity or flexibility thereof being determined by the ratio of components used.

The necessary fastening means for installation of legs or for securing the seat to a vehicle floor can be placed in the mold and the frame molded thereabout, if desired.

Rigid polyurethane foams, semi-rigid polyurethane foams and flexible polyurethane foams and formulations and technics for making them are widely known. For example, both methods and compositions for making foams suitable for use in this invention are disclosed in "High Polymers" volume XVI, entitled "Polyurethanes: Chemistry and Technology" Part II, by J. H. Saunders and K. C. Frisch, published by Interscience Publishers in 1964. Flexible foams particularly advantageous for use in this invention are described in copending U.S. patent application Ser. No. 677,013. It is preferred to use poly (alkylene ether) polyurethanes prepared from known two component systems which are mixed together at the time of molding.

A rigid polyurethane foam best suited for use as a frame in accordance with this invention has a density of at least about 40 kg./m$^3$ a compressive strength of about 2.5 kp./cm.$^2$ at 8% compression and a flexure strength of about 4 kp./cm.$^2$ at 17 mm. bending. The rigid foam may be made self-extinguishing, if desired.

A flexible foam well adapted for use herein has a compression set of less than about 5% after 72 hours at room temperature. Its deflection at 50% deformation must not be greater than about 20 p./cm.$^2$. Its elongation should be not less than about 100%. A semi-rigid foam has properties between those of the rigid foam and flexible foam and at 40% deformation should have a deflection of about 50 p./cm.$^2$. The exact degree of rigidity and flexibility will vary within conventional limits from one seat construction to another depending upon where it will be used.

The method provided by this invention is particularly advantageous for molding polycaprolactone polyester polyurethanes because reaction mixtures which produce such polyurethanes can be reacted at room temperature or over a wide temperature range. Because of the non-critical reaction temperature, mold design can be simple without means for heating the mold. The apparatus and compositions disclosed in my aforesaid application can be used to mix and meter the foamable reaction mixture into the mold.

As indicated hereinbefore, the mold used to manufacture the seat is so designed that the mold bottom and one top cooperate to shape the frame. The same bottom containing the molded frame then combines with a second mold top to shape the upholstery. If a cushion is molded on top of the upholstery, a third top is combined with the bottom and molded in place while the frame and upholstery unit is still in the mold.

One of the important advantages of this invention is realized by using a foamable reaction mixture containing as the polyol a polycaprolactone polyester. Compositions and a process suitable for making foams suitable for this invention are disclosed in U.S. Pat. 3,240,730. Systems comprising a quasi-prepolymer mixture of poly (alkylene ether) polyol and an organic polyisocyanate and a second component which is a mixture of a polyfunctional polyether polyol, water and catalyst can also be used to advantage but the polycaprolactone polyester based systems are preferred. With the latter system, an exceptionally wide range of rigidity can be obtained by variation in formulation permitting the use of several mixing devices to charge different compositions into the mold as described in more detail in my aforesaid application Ser. No. 710,903. All of these mixing devices can draw from the same storage tank but use different ratios thereof to obtain different degrees of rigidity in the resulting foam. It then becomes possible, for example, to supply the material for the upholstery and the cushion or finish upholstery in successive steps through the same mix head. In this case, the time required for switching the metering head and for changing the mold top is just sufficient for the mixture introduced in the first step to foam out completely, particularly when materials reacting at room temperature are used.

The process of the invention is advantageous for making a large number of the same kind of seats at low cost. It is, therefore, particularly advantageous for making seats for automobiles, aircraft and the like where special designs are required but large numbers of seats of the same design are used. A method for making a vehicle seat having a concave metal insert forming the base of the seat frame is described hereinafter. The fabrication of a molded frame above a concave surface is ordinarily very difficult and expensive because it does not have any ridges or corners to facilitate adherence of the foam thereto. However, it can be accomplished in a simple manner in accordance with this invention on a mass production scale.

It is to be noted that because one foam layer is molded directly over the other, the frame, upholstery and molded cushion are cohesively bound together forming a strong unitary construction not depending upon an adhesive composition.

Referring now to the drawings, FIGS. 1 and 4 illustrate one embodiment of a chair having a supporting member or frame 10 of rigid polyurethane foam shaped into a bottom or seat portion, a back and arm portions, and a semi-rigid polyurethane foam upholstery layer 20; the opposing surfaces of 10 and 20 being securely bound together because 20 was foamed in place over the surface of 10 as will be explained in more detail hereinafter. As illustrated in FIGS. 1 and 4, the thickness of frame 10 and upholstery 20 varies depending upon the particular part it is to form of the completed chair. The softness or rigidity of the various parts of the chair can be varied to the anatomical requirements of an occupant of the chair by variation in thickness of the upholstery 20. The chair of FIGS. 1 and 4 is the type which has loose or removable cushions 30 and 31 of flexible polyurethane foam covered with a textile leather or vinyl covering of the type conventionally used in upholstered furniture. Chair legs, castors or the like can be attached in appropriate locations on the underside of frame 10 by conventional methods to the completed chair.

FIG. 3 illustrates schematically the chair of FIG. 1 positioned in a mold in which it has been fabricated. In molding frame 10, mold top 12 is swung to the right as positioned in the drawing, pivoting on hinge 14 attached to mold bottom 16 until the mold is closed forming internally the outline of frame 10. A metered amount of liquid polyurethane foaming mixture is injected into the mold where it expands and solidifies into a rigid polyurethane foam frame 10. Mold top 12 is then swung out of the way and the second mold top 22 mounted on mold bottom 16 by means of hinge 24 is swung into place with frame 10 still positioned in the mold. Closing of the mold with top 22 leaves a cavity above frame 10 in the mold having the configuration of upholstery 20. This cavity is filled by metering in a predetermined volume of liquid foamable polyurethane composition which expands to fill the void and solidifies into a semi-rigid polyurethane upholstery layer 20 being cohesively bound together. For simplicity, mold tops 12 and 22 are shown in section, it being understood that side parts are provided having the contour of the arm portions shown in FIGS. 1 and 4. Frame 10 can be used to support upholstery layers 20 of various configurations by replacing mold top 22 with a top of other desired configurations.

Mold bottom 16 can be attached to more than two mold tops when a seat or chair is to be provided with more than two molded layers or elements.

FIG. 2 illustrates a seat molded in one mold bottom with three mold tops, the seat having frame 10 of rigid polyurethane foam, upholstery 20 which is molded semi-rigid polyurethane foam and a molded flexible polyurethane foam cushion 40. The seat was molded in accordance with the process described above with reference to FIG. 3 but the mold had three tops and three separate foamable polyurethane compositions were injected successively into mold cavities formed by the tops.

The seat of FIG. 2 is provided with concave cap 50 of a magnetizable material such as, for example, soft iron, nickel or other metal. Cap 50 was placed in the mold before the foaming mix which formed frame 10 and upon charging the polyurethane foaming mix for frame 10 in the mold, the foamable liquid reaction mixture expanded and solidified in the mold cavity with cap 50 covering part of that side which was to be the external support side of frame 10. In the embodiment of FIG. 2, cap 50 has an external convex surface which pivots in concave shaped recess 52 of carriage 60. Ball bearings 64 reduce friction between 52 and 50. Electric or permanent magnets 62 embedded in carriage 52 hold the seat in position with respect to carriage 52. Rollers 66 assist in horizontal movement permitting adjustment, an arrangement particularly advantageous for a vehicle seat. The arresting magnets 62, if electromagnets, can be turned on and off when reclining the seat. If magnets 62 are permanent magnets, they can be mechanically actuated in some circumstances with the use of magnet short-circuit devices.

This invention also makes it possible to make seats provided with air pockets or voids which can be inflated. To accomplish this, a film or films of a plastic material such as, for example, polyvinyl chloride film is inserted between the layers of the polyurethane foams over preselected areas to prevent the foam of one layer from being cohesively bound to the adjacent one in the area covered by the film. The two adjacent layers of polyurethane foam cohere to each other around the edges of the film, however, to form a pocket or void.

Figure 6:
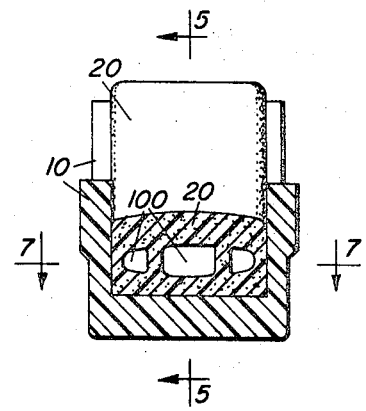
FIG. 6 is a cross section taken along the line VI—VI of FIG. 5.
Figure 7:
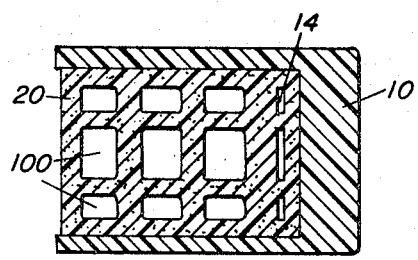
FIG. 7 is a horizontal section taken along the line VII—VII of FIG. 6.

The embodiment illustrated in FIGS. 5, 6 and 7 provides a means for reducing the weight of a seat. This is particularly advantageous for seats used in automobiles and airplanes. In this embodiment, upholstery element 20 is provided with cavities 100. These cavities are much larger than the pores in the foam and can be of various cross-sectional shapes such as circular, elliptical, rectangular or the like. The cross-sectional dimension of the cavity can vary considerably of say from about ¼ inch to several inches depending upon the size of the seat. Usually, the maximum dimension will be no greater than about 12–15 inches.

Since the cavities are filled with gas, usually air, a large proportion of the total volume is occupied by gas, reducing the weight of the seat. If an appropriate overall construction is used, the stability of the seat is not adversely affected, and the seat can be made generally more comfortable, if the gas-filled cavities are properly suited to anatomical requirements.

The gas-filled cavities can be air-filled cushions or bags having walls impervious to air, or pieces of large-celled, soft elastic foamed materials can be foamed in, the pores of these materials forming the gas-filled cavities. The cavities can be of different size, which is governed by the particular construction selected.

The cushioning 20 is foamed on to the seat frame 10 and between the cushioning 20 and the seat frame 10 there are provided gas-filled cavities 100. It can be seen that the size and arrangement of the cavities can be selected to suit anatomical requirements as regards sitting comfort. In particular, it can be seen in FIG. 5 that the cavities in the lower part of the back-rest of the seat are smaller than in the sitting surface and in the upper part of the back-rest. It can be seen in FIGS. 6 and 7 that a larger cavity is provided in the middle of the sitting surface than at the sides of the sitting surface.

In addition to the improved comfort and reduced weight of the seat manufactured in accordance with this embodiment of the invention, the amount of foam required to make a seat is reduced. The seat manufactured by the method does not necessarily need to be softer than a similar seat without the cavities, since the composition of the foamed material for the cushioning can be so selected that it has less elasticity and the seat as a whole has a softness similar to that of an equivalent seat containing no cavities.

Although the invention has been described in considerable detail for the purpose of illustration, it is to be understood that such detail is solely for this purpose and that variations can be made by those skilled in the art without departing from the spirit or scope of the invention except as it is limited by the claims.

The embodiments of the invention in which an exclusive property or privilege is claimed are defined as follows:

1. A seat having a molded rigid polyurethane foam frame, a semi-rigid polyurethane foam layer having a surface substantially coextensive with a surface of said frame and cohesively bound thereto, and a flexible polyurethane foam cushioning layer substantially coextensive with a surface of said semi-rigid foam layer.

2. A seat having a molded rigid polyurethane foam frame and a molded semi-rigid polyurethane foam upholstery layer over the said frame, said frame and upholstery layers having cotnacting coextensive surfaces cohesively bound together, and a magnetized substantially convex external surface on the bottom of said frame positioned in a carriage having a concave surface adjacent said convex surface.

3. A seat having a molded rigid polyurethane foam frame and a molded semi-rigid polyurethane foam upholstery layer having cavities therein laying over the said frame, and upholstery layers having contacting substantially coextensive surfaces cohesively bound together.

4. The seat of claim 1 adapted for vehicles comprising a convex magnetizable external metal surface embedded in the bottom of the frame and resting on ball bearings in a concave cavity of a carriage, said carriage having at least one magnet embedded therein adjacent said metal surface and having means to assist horizontal movement of the seat.

5. The seat of claim 1 comprising an inflatable cavity between the upholstery element and the cushioning layer.

6. The seat of claim 3 wherein said cavities are air-filled cushions having walls impervious to air.

7. The seat of claim 3 wherein the said cavities are cells in a piece of flexible foam embedded in the semi-rigid layer.

8. The seat of claim 3 wherein a plurality of cavities of different size are included in the semi-rigid layer.

9. The seat of claim 1 wherein said flexible polyurethane foam cushioning layer is cohesively bound to the underlying semi-rigid polyurethane foam layer.

References Cited
UNITED STATES PATENTS

| | | | |
|---|---|---|---|
| 3,314,721 | 4/1967 | Smith | 297—445 |
| 3,438,676 | 4/1969 | Brosk | 297—445 |
| 2,748,399 | 6/1956 | Rockoff | 5—348 |
| 2,838,100 | 6/1958 | Follows | 297—421 |
| 2,845,997 | 8/1959 | Waite | 297—457 |
| 3,175,863 | 3/1965 | Hood | 297—455 |

CASMIR A. NUNBERG, Primary Examiner

U.S. Cl. X.R.

297—445, 456